(12) United States Patent
O'Leary et al.

(10) Patent No.: US 8,099,221 B2
(45) Date of Patent: Jan. 17, 2012

(54) METHOD AND SYSTEM FOR CONTROLLING AN ENGINE AND TRANSMISSION USING A DUAL REQUEST CLOSED LOOP REQUEST

(75) Inventors: Patrick J. O'Leary, Clinton Township, MI (US); Barbara A. Shuler, Brighton, MI (US)

(73) Assignee: GM Global Technology Operations LLC

( * ) Notice: Subject to any disclaimer, the term of this patent is extended or adjusted under 35 U.S.C. 154(b) by 427 days.

(21) Appl. No.: 12/436,373

(22) Filed: May 6, 2009

(65) Prior Publication Data
US 2010/0286886 A1 Nov. 11, 2010

(51) Int. Cl.
*B60T 8/32* (2006.01)

(52) U.S. Cl. .............. 701/93; 701/91; 701/96; 701/78; 180/170; 180/179; 180/177

(58) Field of Classification Search ............... 701/91, 701/78, 93, 70, 96; 180/170, 179, 177
See application file for complete search history.

(56) References Cited

U.S. PATENT DOCUMENTS

| 5,713,428 | A * | 2/1998 | Linden et al. ............ 180/179 |
| 6,385,527 | B1 * | 5/2002 | Zumberge et al. ........... 701/91 |

* cited by examiner

*Primary Examiner* — Behrang Badii

(57) ABSTRACT

A method and control module for operating a vehicle powertrain in response to a cruise control includes a primary closed loop control module generating a primary closed loop control signal and a primary torque request signal based on the primary closed loop control signal. The control module also includes a secondary closed loop control module generating a secondary closed loop control signal and a secondary torque request signal based on the secondary closed loop control signal. A transmission control module controls a transmission based on the primary torque request control signal and the secondary torque request signal.

20 Claims, 7 Drawing Sheets

METHOD AND SYSTEM FOR CONTROLLING AN ENGINE AND TRANSMISSION USING A DUAL REQUEST CLOSED LOOP REQUEST

FIELD

The present disclosure relates generally to a method and system for controlling an engine and transmission, and, more specifically to a method and system for controlling an engine and transmission in response to a cruise control request.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Historically, cruise control systems incorporate a single closed loop control, which includes an integrator. An upper bound is applied to the closed loop control to avoid integrator wind-up. The upper bound is typically based on the throttle being fully open (WOT). To achieve necessary downshifts, a torque request must be able to increase above a maximum torque threshold in the current gear. Above the maximum torque threshold, a gasoline engine becomes unthrottled. When the cruise control increases the torque request above the maximum torque threshold using the closed loop control (integrator), but has not yet achieved a downshift, there is no additional response from the powertrain. The point of no additional response is integrator windup. Once the request increases sufficiently and the downshift occurs, the vehicle will begin to respond. However, the additional integrator windup can not be compensated for until the desired vehicle speed is achieved. Consequently, the vehicle speed increases beyond the set speed until the integrator windup has been compensated for.

SUMMARY

The present disclosure provides a method and system to control the torque in the system to avoid overshooting a vehicle set speed.

In one aspect of the disclosure, a method includes activating a cruise control system, generating a primary closed loop control signal, generating a primary torque request signal based on the primary closed loop control signal, generating a secondary closed loop control signal, generating a secondary torque request signal based on the secondary closed loop control signal and controlling a transmission based on the primary torque request control signal and the secondary torque request signal.

In another aspect of the disclosure, a control module for operating a vehicle powertrain in response to a cruise control includes a primary closed loop control module generating a primary closed loop control signal and a primary torque request signal based on the primary closed loop control signal. The control module also includes a secondary closed loop control module generating a secondary closed loop control signal and a secondary torque request signal based on the secondary closed loop control signal. A transmission control module controls a transmission based on the primary torque request control signal and the secondary torque request signal.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
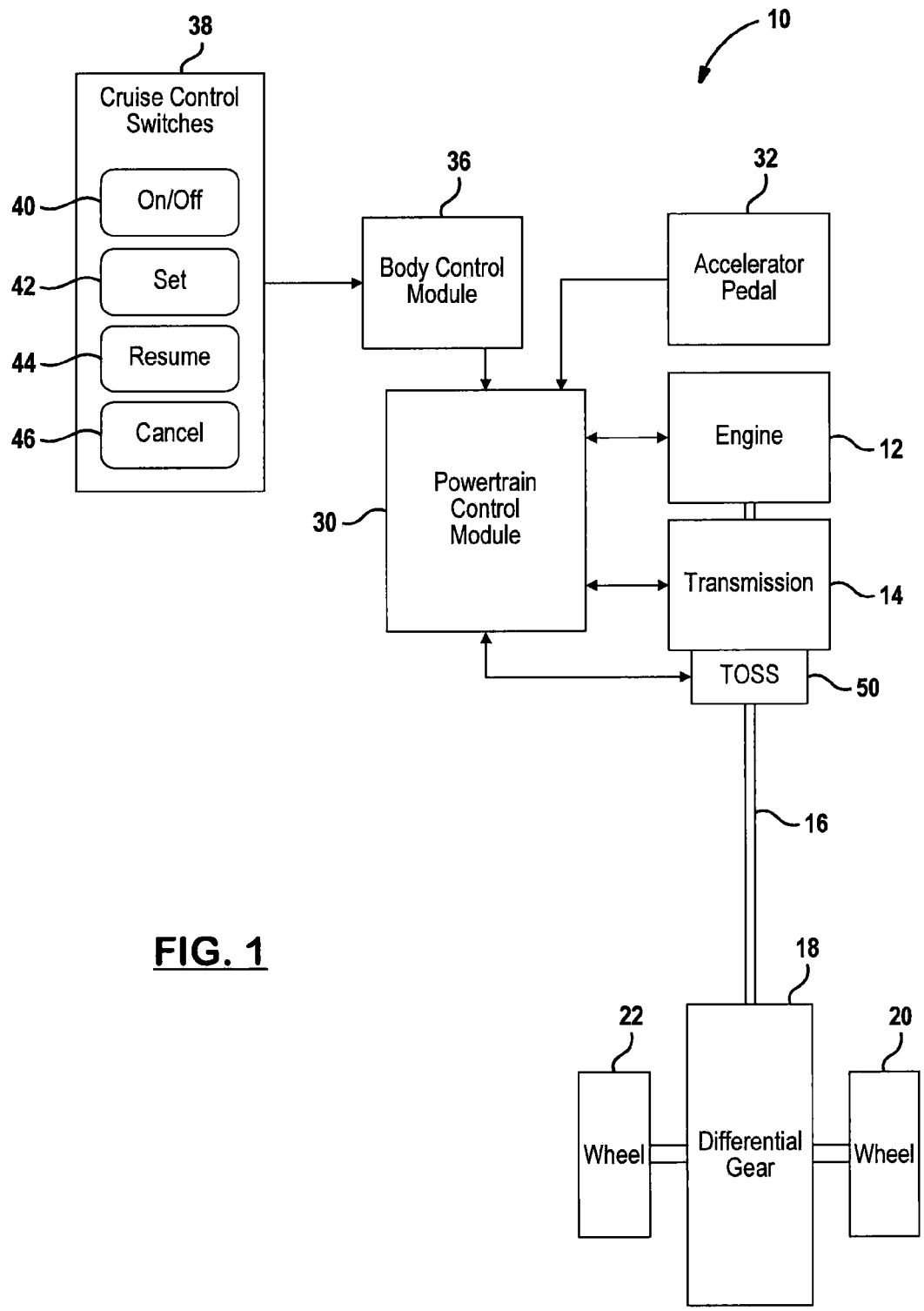
FIG. 1 is a block diagrammatic view of the control system of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Referring now to FIG. 1, a block diagrammatic view of a vehicle 10 is illustrated. The vehicle 10 may include powertrain components such as an engine 12 and a transmission 14. The transmission 14 communicates torque through the driveshaft 16. The driveshaft 16 is mechanically coupled to differential gear 18. The differential gear 18 rotates the wheels 20, 22.

The engine 12 and transmission 14 may be controlled by a powertrain control module 30. The powertrain control module may include two or more separate control modules such as an engine control module and a transmission control module. However, in some applications, the engine control module and transmission control module are incorporated together within a powertrain control module 30. The powertrain control module 30 may be used to generate requested torque based on a position of accelerator pedal 32.

A body control module 36 is in communication with the powertrain control module 30. The body control module 36 may provide various inputs to the powertrain control module 30 for operating the engine 12 and the transmission 14. The body control module 36 may perform cruise control functions. The body control module 36 may be in communication with cruise control switches 38 which may include an On/Off switch 40, a Set switch 42, a Resume switch 44, and a Cancel switch 46. Such switches may be located so that the driver may easily reach the switches. Common locations for such switches include on a stalk such as a turn signal stalk or an accessory stalk, or on the steering wheel.

As will be set forth below, the cruise control system set forth in the present disclosure uses a maximum available torque in the selected gear to provide an upper limit to avoid integrator windup described above. The upper limit prevents the torque request from increasing sufficiently to achieve necessary transmission downshifts. Essentially, a maximum available torque in the current gear is the upper limit on a primary close loop control. The torque request is used in the delivery of torque by the powertrain control module. Since the powertrain control module is able to deliver the requested torque, integrator windup is avoided. Additionally, a transmission shift torque request signal may be added to the torque request signal. The transmission shift torque request signal is used in addition to the original torque request to calculate the accelerator effective pedal position used by the transmission control to determine a gear shift determination. Once a downshift is achieved, the maximum torque in the current gear will be increased to affect a lower gear capability. The primary closed loop control may increase the closed loop torque request to take advantage of the increased maximum torque. If the gear downshifted to is not capable of delivering the desired torque, the process may be used to achieve an additional downshift. Once a gearshift is achieved that is capable of delivering the desired torque, a new closed loop control torque value will be sustained until a significant margin allows an upshift to prevent the transmission from being too busy.

A transmission output speed sensor signal 50 may be in communication with the output shaft of the transmission to provide an output speed. The output speed may correspond to the speed of the vehicle.

Figure 2:
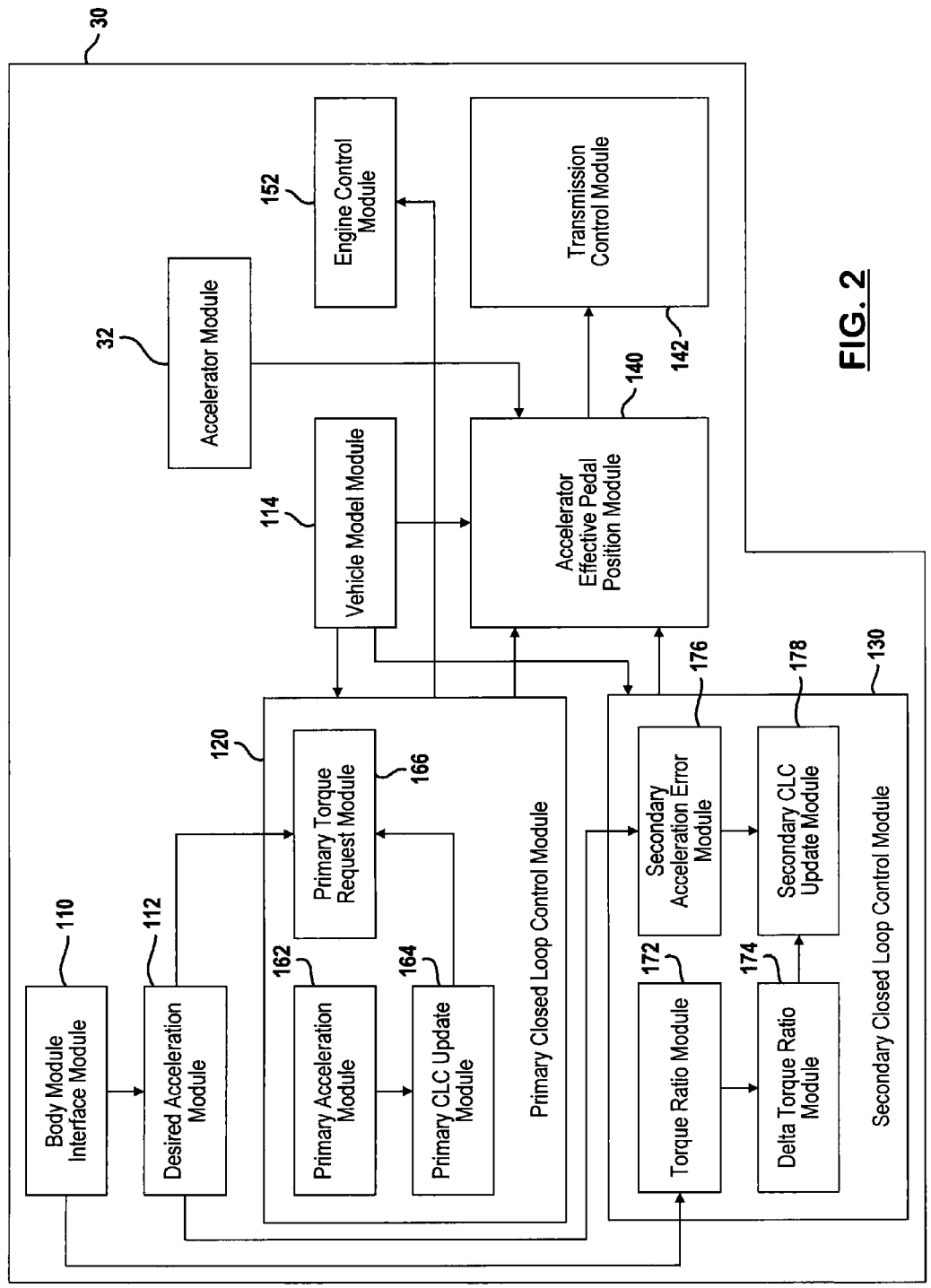
FIG. 2 is a block diagrammatic view of a control module according to the present disclosure.

Referring now to FIG. 2, the powertrain control module 30 is illustrated in further detail. The powertrain control module 30 may include a body module interface module 110 used to interface with the body control module 36 illustrated in FIG. 1. The body module interface module 110 may receive various signals such as cruise control signals including cruise control switch state signals.

The powertrain control module 30 may also include a desired acceleration module 112. The desired acceleration module 112 may receive signals from the cruise control switches 38 through the body module interface module 110 or from the accelerated pedal 32 to determine a desired acceleration for the vehicle.

The powertrain control module may also include a vehicle model module 114 that includes a model of various mechanical features of the vehicle including the differential gear and the transmission gears. This allows the powertrain module to know how the vehicle will react in response to various inputs such as torque inputs.

The vehicle model module 114 may be in communication with a primary closed loop control module 120 that determines a primary closed loop control signal and primary torque.

A secondary closed loop control module 130 may also be included within the powertrain control module 30. The secondary closed loop control module 130 may generate a secondary closed loop control signal and a secondary torque.

An accelerator effective pedal position module 140 may also be included within the powertrain control module 30. The accelerator effective pedal position module 140 may generate an accelerator effective pedal position that is used in the gearshift determination. The accelerator effective pedal position may use the accelerator position from the accelerator pedal 32, which is adjusted based upon the primary closed loop control module 120 and the secondary closed loop control module 130 as will be described below.

The accelerator effective pedal position module 140 may be used to control the transmission control module 142 and the gearshifts generated thereby.

The primary closed loop control module 120 may also be used to generate torque commands to an engine control module 152.

The primary closed loop control module 120 may include a primary acceleration error module 162. The primary acceleration error module may generate a primary acceleration error based upon the measured acceleration and a predicted acceleration of the vehicle. The primary acceleration error may be communicated from the primary acceleration error module 162 to a primary closed loop control (CLC) update module 164. The primary closed loop control update module 164 may communicate the primary closed loop control signal to a primary torque request module 166. The primary torque request module 166 may generate a primary torque request for torque to be delivered using the desired acceleration, the primary closed loop control and the vehicle model. The primary torque request signal may then be communicated to the engine control module 152.

The secondary closed loop control module 130 may include a torque ratio module 172 that is used to generate a torque ratio of the cruise torque request and the maximum axle torque. The torque ratio module may communicate the torque ratio to a delta torque ratio module 174. The delta torque ratio module 174 may determine a delta torque ratio signal corresponding to the torque ratio minus a calibrated threshold.

The secondary closed loop control module 130 may also include a secondary acceleration error module 176. The secondary error acceleration module 176 may generate a secondary acceleration error based upon the desired acceleration and the predicted acceleration. The secondary acceleration error signal and the delta torque ratio signal may be used to generate a secondary closed loop control update that includes a secondary torque request in a secondary closed loop control (CLC) update module 178. The secondary torque request may be provided to the accelerator effective pedal position module 140. The signals from the primary closed loop control module 120 may be provided to the accelerator effective pedal position module 140 and the engine control module 152.

Figure 3:
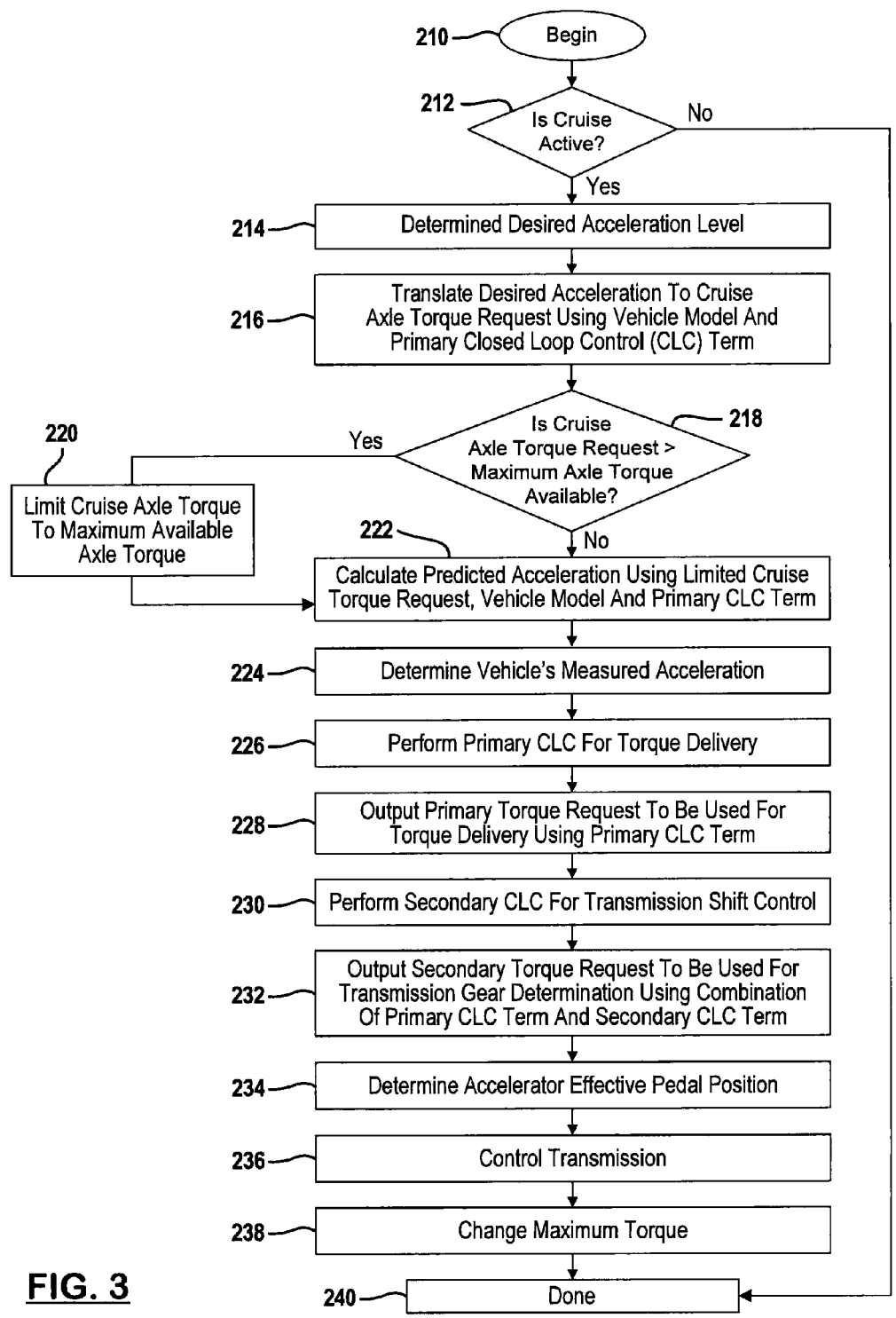
FIG. 3 is a flowchart of a method of controlling vehicle torque and controlling a transmission.

Referring now to FIG. 3, a method for operating the system is illustrated. The system begins in step 210. In step 212, it is determined whether or not the cruise control system is active. If the cruise control system is not active the system ends in step 240. When the cruise control is active the present system is applicable. In step 214 the desired acceleration level is determined. The desired acceleration level may be determined from the torque requests from the cruise control system, vehicle response or cruise switch states.

In step 216, the desired acceleration is translated to a cruise axle torque request using the vehicle model and a primary closed loop control term. In step 216, it is determined whether or not the cruise axle torque request determined in step 216 is greater than a maximum axle torque available. The maximum axle torque available may be provided from the vehicle model module 114 illustrated in FIG. 2. If the cruise axle torque request is greater than the maximum axle torque available, the cruise axle torque is limited to the maximum available axle torque in step 220. After step 220 and when the cruise axle torque request is not greater than the maximum axle torque available, step 222 is performed. In step 222, the predicted acceleration using the limited cruise torque request, the vehicle model and the primary closed loop control term is calculated.

In step 224, the vehicle's measured acceleration is determined. The vehicle's measured acceleration may be determined from the transmission output speed sensor 50 illustrated in FIG. 1. The acceleration may also be determined in various ways including a direct sensor or obtained through other types of sensors such as wheel speed sensors of the vehicle.

In step 226, the primary closed loop control is performed for the torque delivery. This will be further described in FIG. 4 below. Step 226 essentially returns an updated primary closed loop control using a primary acceleration error and a primary torque request corresponding thereto.

In step 228, the primary torque request for torque delivery using the primary closed loop control is output. The primary torque control may be used by the engine control aspect of the powertrain control module as well as the transmission control aspect of the powertrain control module 30 illustrated in FIG. 1.

Figure 5:
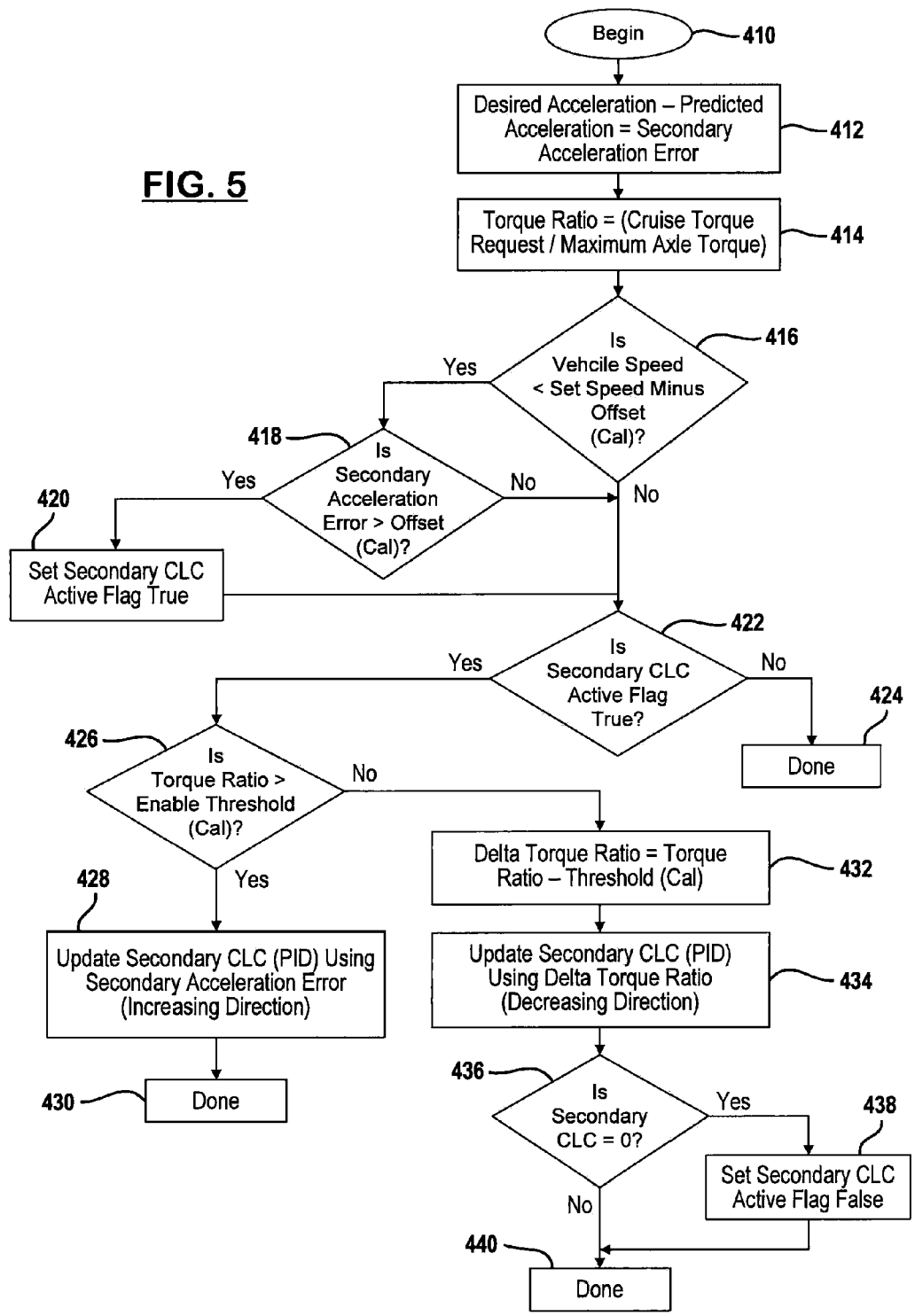
FIG. 5 is a flowchart of a secondary closed loop control of FIG. 3.

In step 230, a secondary closed loop control module for transmission shift control is performed. This step will be further described in FIG. 5 below. The outputs of FIG. 5 are a secondary acceleration error and a secondary closed loop control. In step 232, the secondary torque request is output to be used by the transmission gear determination using a combination of the primary closed loop control term and the secondary closed loop control term. In step 234, the accelerator effective pedal position (AEPP) may be determined in the transmission gear determination. In step 236, the transmission is controlled with the accelerator effective pedal position. In step 238, the maximum torque for the downshifted gear is increased and the system again is operated. Another downshift may be determined in the same way with the new gear. After step 238, step 240 is performed. Step 240 ends the method.

Figure 4:
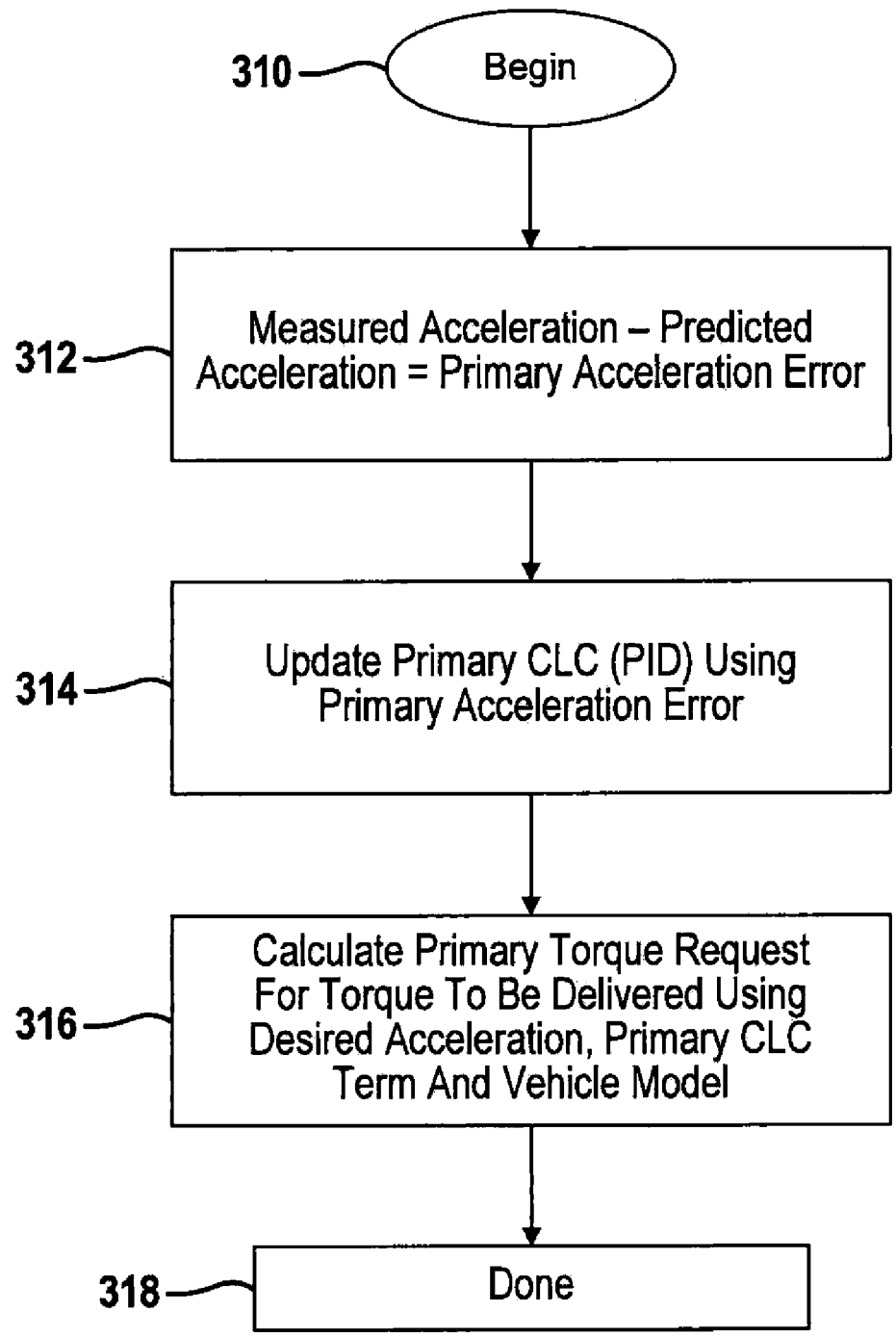
FIG. 4 is a flowchart of the primary closed loop control of FIG. 3.

Referring now to FIG. 4, a method for performing the primary closed loop control is illustrated in further detail. The primary closed loop control determination method begins in step 310. In step 312, a primary acceleration error is determined by subtracting the predicted acceleration from the measured acceleration.

In step 314, the primary closed loop control signal is updated using the primary acceleration error generated in step 312. In step 316, a primary torque request for torque to be delivered is determined using the desired acceleration, the primary closed loop control acceleration term and the vehicle model. The primary closed loop control ends in step 318. As mentioned above, the output of FIG. 4 is provided to step 228 of FIG. 3.

Referring now to FIG. 5, the secondary closed loop control method is set forth. The secondary closed loop control module begins in step 410. In step 412, a secondary acceleration error is generated by subtracting the predicted acceleration from the desired acceleration. In step 414, the torque ratio is determined. The torque ratio may be determined by the ratio of the cruise torque request and the maximum axle torque.

In step 416, the vehicle speed is compared to the set speed minus a calibration offset. When the vehicle speed is less than the set speed minus a calibration offset, step 418 is performed. In step 418, if the secondary acceleration error is greater than the offset calibration, step 420 sets the secondary closed loop control active flag to true. In step 418, if the secondary acceleration error is not greater than an offset calibration or in step 416, if the vehicle speed is not less than the set speed minus an offset calibration, step 422 is performed. In step 422, the secondary closed loop control active flag is monitored. If the secondary closed loop control active flag is not true, step 424 ends the process. In step 422, when the secondary closed loop control active flag is true, step 426 determines whether the torque ratio is greater than an enable threshold which is calibratable. If the torque ratio is greater than an enable threshold, step 428 updates the secondary closed loop control using the secondary acceleration error in an increasing direction. Thereafter, step 430 ends the process.

Referring back to step 426, when the torque ratio is not greater than an enable threshold, step 432 is performed. In step 432, a delta torque ratio is determined as the difference between the torque ratio and the threshold calibration. After step 432, step 434 updates the secondary closed loop control using the delta torque ratio in a decreasing direction. Thereafter, step 436 is performed. Step 436 determines whether the secondary closed loop control is equal to zero. If the secondary closed loop control value is not equal to zero step 440 ends the process. If the secondary closed loop is equal to zero in step 436, step 438 is performed which sets the secondary closed loop control active flag to false. After step 438, step 440 is performed.

Figure 6A:
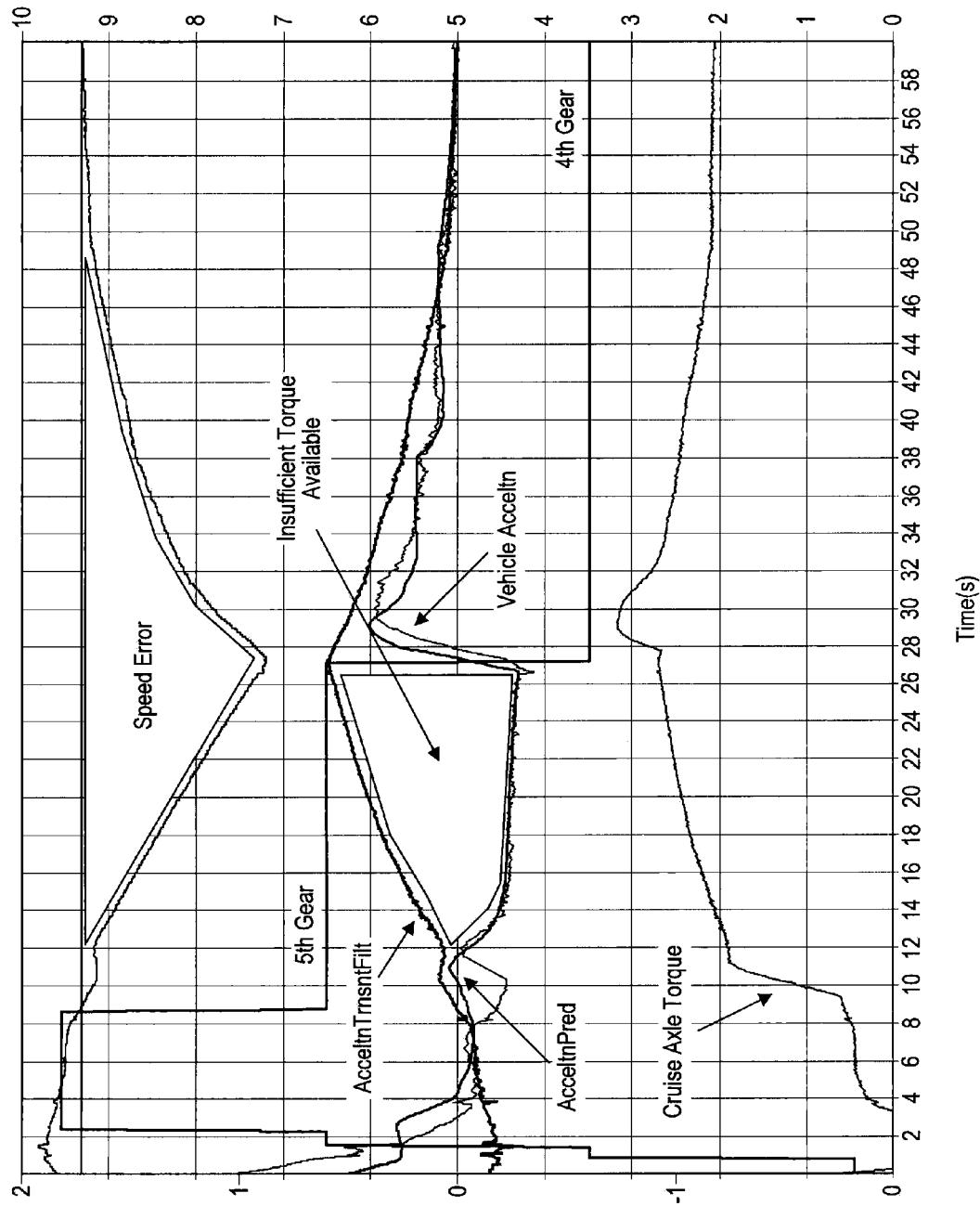
FIG. 6A is a plot of the transmission gear signals, a filtered transient acceleration signal, a predicted acceleration signal, a vehicle acceleration signal and a cruise axle torque all versus time.

Referring now to FIG. 6A, a plot of various signals including a speed error bounded by the vehicle speed at the bottom versus a memory speed at the top. A triangular-shaped speed error area is illustrated. A filtered acceleration transient signal (desired acceleration) is illustrated bounding an insufficient torque available area. The predicted acceleration bounds the insufficient torque available area at the bottom. The insufficient torque available is for the fifth gear as illustrated by the fifth gear line with a downshift to fourth gear.

Figure 6B:
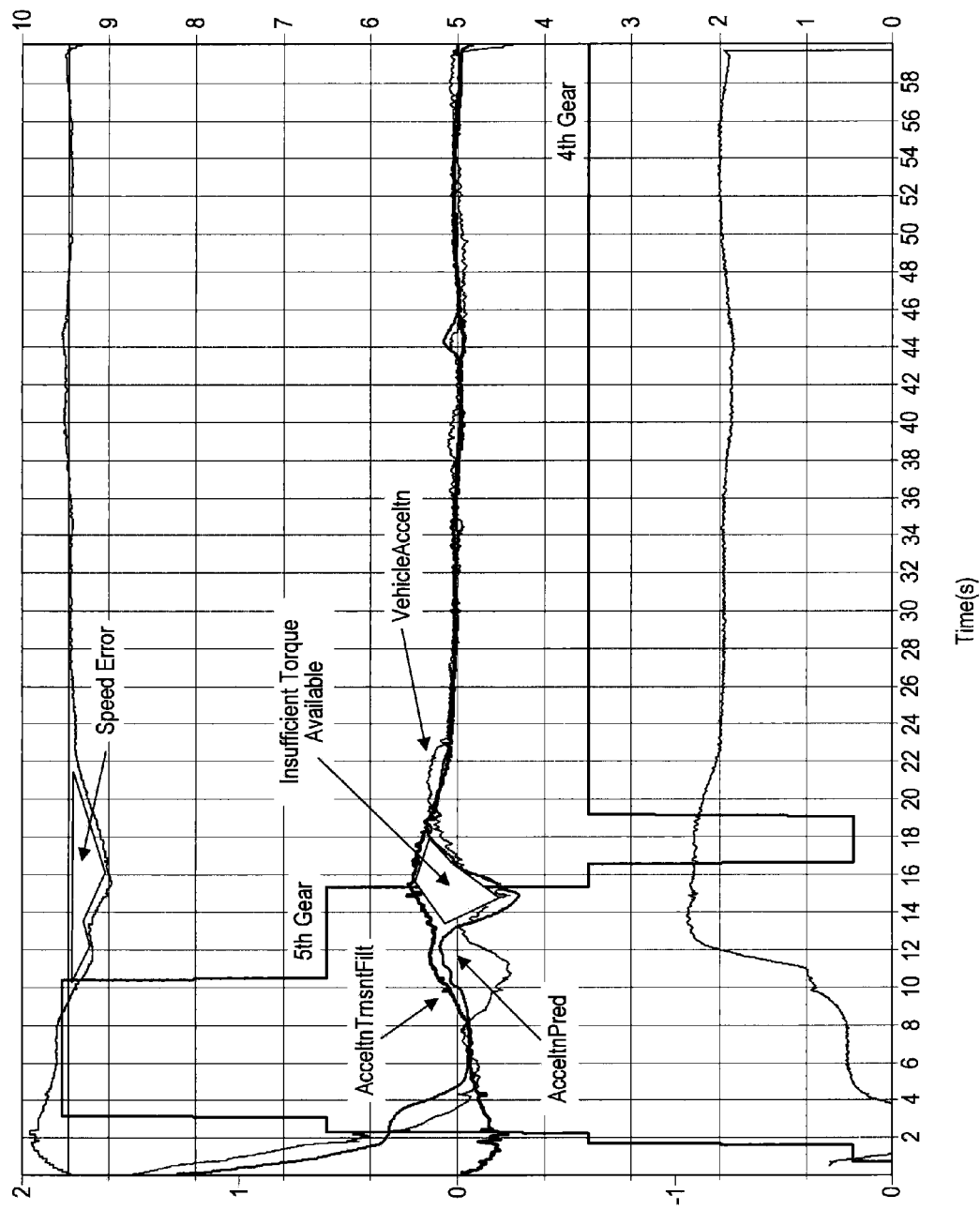
FIG. 6B is a plot similar to FIG. 6A except using the over-scale pedal determination as set forth in the present disclosure.

Referring now to FIG. 6B, by using the over-scaled pedal position determined in the present disclosure the insufficient torque available area is minimized. Also, the speed error is also minimized.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method comprising:
   activating a cruise control system;
   generating a primary closed loop control signal;
   generating a primary torque request signal based on the primary closed loop control signal;
   generating a secondary closed loop control signal;
   generating a secondary torque request signal based on the secondary closed loop control signal; and
   controlling a transmission based on the primary torque request signal and the secondary torque request signal.

2. A method as recited in claim 1 wherein generating the primary closed loop control signal comprises generating the primary closed loop control signal in response to a primary acceleration error signal.

3. A method as recited in claim 2 further comprising generating the primary acceleration error signal in response to a measured acceleration signal and a predicted acceleration signal.

4. A method as recited in claim 3 further comprising generating the predicted acceleration signal based on a vehicle model and a limited cruise torque request.

5. A method as recited in claim 1 wherein generating the primary torque request signal comprises generating the primary torque request signal based on a desired vehicle acceleration and a vehicle model.

6. A method as recited in claim 1 wherein generating the secondary closed loop control signal comprises generating the secondary closed loop control signal based on a secondary acceleration error.

7. A method as recited in claim 1 further comprising generating a secondary acceleration error signal based on a desired acceleration signal and a predicted acceleration signal.

8. A method as recited in claim 7 further comprising generating the predicted acceleration signal based on a vehicle model and a limited cruise torque request.

9. A method as recited in claim 1 wherein generating the secondary torque request signal comprises generating the secondary torque request signal based on a torque ratio signal.

10. A method as recited in claim 9 further comprising generating the torque ratio signal based on a cruise torque request and a maximum axle torque ratio.

11. A method as recited in claim 10 wherein generating the secondary closed loop control signal comprises generating the secondary closed loop control signal based on the torque ratio signal.

12. A method as recited in claim 11 wherein generating the secondary closed loop control signal comprises generating the secondary closed loop control signal based on the torque ratio signal and a vehicle speed signal.

13. A method as recited in claim 1 further comprising determining an accelerator effective pedal position based on the primary torque request signal and the secondary torque request signal.

14. A control module for operating a vehicle powertrain in response to a cruise control comprising:
   a primary closed loop control module generating a primary closed loop control signal and a primary torque request signal based on the primary closed loop control signal;
   a secondary closed loop control module generating a secondary closed loop control signal and a secondary torque request signal based on the secondary closed loop control signal; and
   a transmission control module controlling a transmission based on the primary torque request signal and the secondary torque request signal.

15. A control module as recited in claim 14 further comprising a primary acceleration error module generating a primary acceleration error signal and wherein the primary closed loop control module generates the primary closed loop control signal in response to the primary acceleration error signal.

16. A control module as recited in claim 15 wherein the primary acceleration error signal is based on a measured acceleration signal and a predicted acceleration signal.

17. A control module as recited in claim 15 wherein the primary torque request signal is based on a desired vehicle acceleration and a vehicle model.

18. A control module as recited in claim 15 wherein generating the secondary closed loop control signal comprises generating the secondary closed loop control signal based on a secondary acceleration error signal.

19. A control module as recited in claim 18 wherein the secondary acceleration error signal is based on a desired acceleration signal and a predicted acceleration signal.

20. A control module as recited in claim 14 wherein the secondary torque request signal is based on a torque ratio signal.

* * * * *